US006350298B1

(12) United States Patent
Su et al.

(10) Patent No.: US 6,350,298 B1
(45) Date of Patent: Feb. 26, 2002

(54) ADSORBENTS AND ADSORPTIVE SEPARATION PROCESS

(75) Inventors: Bao-Lian Su, Saint-Servais (BE); Martin Bulow, Basking Ridge, NJ (US); Jean-Luc Blin, Denain (FR); Adeola F. Ojo; Sudhakar Jale, both of Scotch Plains, NJ (US); Dongmin Shen, Berkeley Heights, NJ (US); Qing Min Wang, North Plainfield, NJ (US); Frank R. Fitch, Bedminster, NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 09/426,994

(22) Filed: Oct. 26, 1999

Related U.S. Application Data
(60) Provisional application No. 60/106,468, filed on Oct. 30, 1998.

(51) Int. Cl.$^7$ .............................................. B01D 53/047
(52) U.S. Cl. ............................... 95/96; 95/129; 95/130; 95/139; 95/140; 95/902; 96/108
(58) Field of Search .................... 95/96–106, 114, 95/115, 129, 130, 139, 140, 902; 96/108; 502/64, 73, 74, 77, 78, 79, 85

(56) References Cited

U.S. PATENT DOCUMENTS

| | | | |
|---|---|---|---|
| 2,882,244 A | 4/1959 | Milton | |
| 3,140,933 A | 7/1964 | McKee | 55/68 |
| 4,859,217 A | 8/1989 | Chao | 55/68 |
| 4,925,460 A | 5/1990 | Coe et al. | 55/25 |
| 5,152,813 A | 10/1992 | Coe et al. | 55/26 |
| 5,179,979 A | 1/1993 | Zollinger | 139/449 |
| 5,252,528 A | 10/1993 | Voecks et al. | 502/74 |
| 5,258,058 A * | 11/1993 | Coe et al. | 95/902 X |
| 5,417,957 A | 5/1995 | Coe et al. | 423/700 |
| 5,419,891 A | 5/1995 | Coe et al. | 423/700 |
| 5,464,467 A | 11/1995 | Fitch et al. | 95/98 |
| 5,616,170 A * | 4/1997 | Ojo et al. | 95/902 X |
| 5,658,370 A * | 8/1997 | Vigor et al. | 95/902 X |
| 5,858,068 A * | 1/1999 | Lansbarkis et al. | 95/902 X |
| 5,922,107 A * | 7/1999 | Labasqul et al. | 95/130 X |
| 6,033,461 A * | 3/2000 | Yang et al. | 95/129 |
| 6,053,966 A * | 4/2000 | Moreau et al. | 95/902 X |

FOREIGN PATENT DOCUMENTS

| | | |
|---|---|---|
| DE | 14 67 180 | 2/1969 |
| EP | 0 170 884 | 2/1986 |
| EP | 0 224 150 | 6/1987 |
| GB | 1 079 106 | 8/1967 |

OTHER PUBLICATIONS

Shozo Furuyama and Katsumi Sato, "Sorption of Argon, Oxygen, Nitrogen, Nitric Oxide, and Carbon Monoxide by Lithium, Sodium, Potassium, and Cesium Mordenites", J. Phys. Chem. 1982, 86, 2498–2503.

Hideo Minato and Masahisa Watanabe, "Adsorption of $CO_2$ and $N_2$ Gases on Natural Zeolites and Its Theoretical Interpretations", Dept. of Earth Science & Astronomy, College of General Education, University of Tokyo, Komaba Meguro–ku, Tokyo 153; pp. 135–141.

* cited by examiner

*Primary Examiner*—Robert H. Spitzer
(74) *Attorney, Agent, or Firm*—Philip H. Von Neida; Salvatore P. Pace

(57) ABSTRACT

Novel compositions of molecular sieve adsorbents are provided in which at least 50% of the exchangeable cations are selected from those of Li, Ca, Ag and Cu and which have within their pore system metal oxide, metal oxide precursors or mixtures thereof. These compositions are useful for the separation of gases and, in particular, the separation of nitrogen from air to produce oxygen or oxygen-enriched gas.

16 Claims, No Drawings

ADSORBENTS AND ADSORPTIVE SEPARATION PROCESS

This application claims priority from Provisional Patent Application No. 60/106,468 filed Oct. 30, 1998.

FIELD OF THE INVENTION

This invention relates to novel adsorbent compositions and their use, and more particularly, to certain molecular sieve materials such as cation-exchanged zeolites having metal oxides within their pore system. The invention also relates to a method for separating gases such as the separation of nitrogen from air for oxygen production using the novel adsorbent compositions.

BACKGROUND OF THE INVENTION

The separation of nitrogen from other gases, such as oxygen and argon, is of considerable industrial importance. If the separation is conducted on a large scale, fractional distillation is often employed. Distillation is quite expensive, however, because of the large initial capital cost of equipment and the considerable energy requirement involved. In recent times other separation methods have been investigated in efforts to reduce the overall cost of such separations.

An alternative to distillation that has been used to separate nitrogen from other gases is adsorption. For example, sodium X zeolite, described in U.S. Pat. No. 2,882,244 to Milton, has been used with some success for the adsorptive separation of nitrogen from oxygen. A disadvantage of the use of sodium X zeolite for the separation of nitrogen from oxygen is that it has low separation efficiency for nitrogen separation. While this adsorbent strongly adsorbs nitrogen, it also adsorbs substantial amounts of oxygen.

Later research efforts led to the development of adsorbents having considerably improved nitrogen adsorption properties. According to U.S. Pat. No. 3,140,933, type X zeolite in which some of the sodium cations of the zeolite are replaced by lithium cations can be effectively used to separate nitrogen from oxygen at temperatures up to 30° C.

U.S. Pat. No. 4,859,217 discloses that very good adsorptive separation of nitrogen from oxygen can be obtained at temperatures of 15 to 70° C. using a type X zeolite which has more than 88% of its cations present as lithium cations, particularly when a zeolite having an Si/Al atomic ratio of 1 to 1.25 is used.

U.S. Pat. No. 5,179,979 asserts that lithium/alkaline earth metal X zeolites having lithium/alkaline earth metal molar ratios in the range of about 95:5 to 50:50 have thermal stabilities greater than the corresponding pure lithium zeolites and good adsorption capacities and selectivities.

U.S. Pat. No. 5,152,813 discloses the adsorption of nitrogen from gas mixtures using X-zeolites having a zeolitic Si/Al ratio <1.5 and at least binary cation exchange of the exchangeable cation content with between 5 and 95% lithium and between 5 and 95% of a second cation selected from calcium, strontium and mixtures of these, the sum of the lithium cations and second exchangeable cations being at least 60%.

Lithium-exchanged natural mordenite is reported to be a good adsorbent for oxygen pressure swing adsorption (PSA) in papers by H. Minato and M. Watanabe, published in Scientific Paper, University of Tokyo, (1978), 28, 218, and S. Fukuyama and K. Sato in the Journal of Physical Chemistry (1982), 86, 2498–2503.

U.S. Pat. No. 4,925,460 discloses a process for the separation of gas mixtures, where the components differ in heats of adsorption, e.g. nitrogen from air utilizing chabazite (Si/Al ratio 2.1 to 2.8) in which more than 65% of the cations have been exchanged with lithium cations. This patent also discloses a process for the preparation of the novel adsorbent.

U.S. Pat. No. 5,464,467 discloses the preparation of lithium- and trivalent cation-exchanged type X zeolites that are useful for the adsorptive separation of nitrogen from other gases.

Although the above-described zeolites, particularly the lithium-exchanged type X zeolites, have excellent nitrogen adsorption properties, there is still a need in improving separation selectivity by increasing nitrogen sorption and/or decreasing oxygen sorption at given process conditions. Extensive efforts are continuously made to make adsorption-based air separation processes more competitive with cryogenic distillation methods. This invention makes strides in this direction by presenting novel adsorbents which enhance the separation factor of nitrogen-selective adsorbents, with regard to air separation. Further, these novel adsorbent compositions can be used in other gas separation processes.

SUMMARY OF THE INVENTION

According to a first broad embodiment, the invention comprises a composition comprising a molecular sieve material containing more than 50% of the total exchangeable cations being at least one cation selected from the group Li, Ca, Ag, Cu and mixtures thereof and having within its pore system at least one compound which is a metal oxide selected from $Li_2O$, $Ag_2O$, $CuO$, $Cu_2O$, $CaO$, $MgO$, $SrO$, $ZnO$, $CdO$, $B_2O_3$, $Al_2O_3$, $Ga_2O_3$, $La_2O_3$, $Ce_2O_3$, $TiO_2$, $ZrO_2$, $V_2O_5$, $MnO$ $MnO_2$, $FeO$, $Fe_2O_3$, $NiO$, a precursor of these metal oxides and mixtures thereof.

In another embodiment of this invention, a method is provided for separating gases by removing a first gas selected from carbon dioxide, carbon monoxide, dinitrogen oxide and nitrogen from a gas stream comprised of one or more of said first gas and other gases with weaker specific interaction with the adsorbent material than said first gas, said method comprising passing said gas stream through at least one adsorption zone containing the adsorbent compositions of this invention, thereby producing an enriched component of one or more of said first gas.

In another embodiment, the invention comprises a method of producing oxygen from an oxygen containing gas mixture comprising passing the gas mixture through at least one adsorption zone containing one of the compositions identified in the first broad embodiment of the invention, thereby yielding an oxygen-depleted adsorbed component and an oxygen-enriched nonadsorbed gas component. In a preferred aspect of this embodiment, the method includes, in addition to the step of passing the gas mixture through the at least one adsorption zone, the step of desorbing the oxygen-depleted adsorbed component from the at least one adsorption zone. Most preferably, the method comprising repeatedly passing the gas mixture through the at least one adsorption zone and desorbing the oxygen-depleted adsorbed component from the at least one adsorption zone as steps of a cyclic adsorption process selected from pressure swing adsorption, temperature swing adsorption or a combination of these.

DETAILED DESCRIPTION OF THE INVENTION

The novel adsorbent compositions of the invention are selected molecular sieve materials such as zeolites or mesopore-structured materials that have metal oxides or metal oxide precursors in their pore systems and having more than 50% of the exchangeable cations being certain cations as described below. As used herein, the term "zeolite" has its ordinary meaning, as defined in W. M. Meier, D. H. Olson, and Ch. Baerlocher, Atlas of Zeolite Structure Types, Elsevier, London, Boston, 1996, but in particular natural or synthetic crystalline aluminosilicates, and the term "mesopore-structured materials" means crystalline or amorphous metal oxides having regularly structured pore systems wherein the average size of the pores is in the range of about 1.5 to about 5 nanometers, for the purposes of this invention. The term "metal oxide precursor" as used herein means a compound which upon activation produces a stable oxide or oxide compound that undergoes no significant further modification upon further treatment in the presence of oxygen, such as activation and calcination.

Although the mechanism involved in the operation of the invention is not fully understood, it appears that the presence of the metal oxide or metal oxide precursor in combination with that of the lattice-charge compensating cations in the adsorbent enhances the ability of the adsorbent towards stronger expressed preferred adsorbability of nitrogen and other gas mixture components that show specific sorption interactions with the adsorbent material. In other words, the metal oxide or precursor appears to enhance the selectivity of the cation containing adsorbent for the strongly adsorbed component(s) of the fluid mixture. It has been observed that the adsorbent compositions of the invention are particularly effective in enhancing the adsorption of nitrogen by adsorbents that weakly adsorb oxygen from gas mixtures. Thus, the metal oxide- or metal oxide precursor-containing adsorbents are particularly effective for separating nitrogen from oxygen in gas mixtures, such as air, by vacuum (pressure) swing adsorption processes. This makes it possible to operate those oxygen production adsorption processes much more effectively than was formerly possible.

Zeolites whose nitrogen adsorption properties are enhanced by incorporating metal oxides or metal oxide precursors in addition to the cations therein include the natural and synthetic zeolites belonging to the following structural classification families: BEA, CHA, EMT, ERI, FAU, FER, GIS, HEU, LTA, LTL, MAZ, MEI, MEL, MFI, MOR, MTW, OFF, ZSM-2, ZSM-18, ZSM-48 and mixtures thereof. Specific zeolites as members of these classes are BEA: beta, tschernichite, etc.; CHA: chabazite, Linde D, Linde R, phi, etc.; EMT: ZSM-3, ZSM-20, hexagonal faujasite, etc.; ERI: erionite, LZ-220, etc.; FAU: faujasite, type X zeolite, type Y zeolite, etc.; FER: ZSM-35, Fu-9, etc.; GIS; synthetic zeolite P, TMA-gismondine, etc.; HEU: clinoptilolite, heulandite, LZ-219, etc.; LTA: type A zeolite, alpha, ZK-4, etc.; LTL: Linde type L, LZ-212, perlialite, etc.; MAZ: ZSM-4, omega, etc.; MEL: silicalite-II, TS-2, etc.; MFI: ZSM-5, silicalite-I, etc.; MOR: large port mordenite, LZ-211, zeolon, etc.; MTW: Nu-13, theta-3, etc.; and OFF: offretite, Linde type T, LZ-217 etc. For more information on those structures, cf., W. M. Meier, D. H. Olson, and Ch. Baerlocher, Atlas of Zeolite Structure Types, Elsevier, London, Boston, 1996.

Specific examples of zeolites that are preferred for use in producing the adsorbent compositions of the invention are natural zeolites, such as mordenite, erionite, clinoptilolite and chabazite, and synthetic zeolites, such as type X zeolite, type A zeolite, type Y zeolite, mordenite, chabazite and ZSM-5. The most preferred zeolite is type X zeolite, having a Si/Al ratio in the range of about 0.9 to about 1.25, more preferably about 0.9 to about 1.1.

The above zeolites may be used in their natural state or in the form that they are originally prepared, i.e., with the exchangeable cations that they possess in nature or which they have when they are first prepared, or they may be modified by replacing the original cations with other cations. Most commonly, the zeolites originally have sodium, potassium,calcium and/or magnesium cations. By cation exchange processes, the original zeolites may be modified so that they have substantially only one cation, or they can be modified so that they possess two or more exchangeable cations. Suitable zeolites are those of which at least 50%, preferably 70%, and most preferably 90%, of their exchangeable cations are selected from Li, Ca, Ag, Cu and mixtures thereof.

As described above, more than 50% of the available cations in the molecular sieve must be exchanged to one of the aforementioned cations. Such modifications and the techniques for such exchanges are well known to those skilled in the art. The total amount of the Li, Ca, Ag and Cu cations in any given molecular sieve will vary depending on the molecular sieve lattice composition. Examples of other useful cations which may be present from 0 to 50%, preferably 0.1 to 29.9%, include one or more of the following groups: monovalent cations, selected from sodium and potassium and mixtures thereof; divalent cations, such as magnesium, barium, strontium, zinc, copper-II and mixtures of these; trivalent cations, such as aluminum, scandium, gallium, iron III, chromium III, indium, yttrium, single lanthanides, mixtures of two or more lanthanides and mixtures of these, and mixtures of the above monovalent, divalent and trivalent cations. Lastly, 0 to 15%, preferably 0.1 to 15%, of additional exchangeable cations may be present. These cations are residual cations selected from ammonium, hydronium, zinc, copper I and mixtures of these.

Preferred zeolites can also have combinations of two or more different cations as their exchangeable cations. Examples of preferred cation combinations include lithium and other monovalent cation-exchanged zeolites, such as mixed lithium/sodium cation-exchanged zeolites, mixed lithium/potassium cation-exchanged zeolites and lithium/sodium/potassium cation-exchanged zeolites; lithium/divalent cation-exchanged zeolites, such as mixed lithium/calcium cation-exchanged zeolites, mixed lithium/magnesium cation-exchanged zeolites, mixed lithium/strontium cation-exchanged zeolites, mixed lithium/calcium/magnesium cation-exchanged zeolites; mixed lithium/trivalent cation-exchanged zeolites, such as mixed lithium/rare earth cation cation-exchanged zeolites, for example mixed lithium/lanthanum cation-exchanged zeolites, etc.; and mixed calcium/monovalent cation-exchanged zeolites, such as mixed calcium/sodium cation-exchanged zeolites, mixed calcium/lithium cation-exchanged zeolites, etc. In the above examples, the first named cation of the combination is generally present as the predominant cation.

In the most preferred aspect, the exchangeable cations comprise at least 70 to about 98.8%, preferably at least 90% lithium cations, about 0.1 to about 29.9% of the above-named monovalent and/or divalent and/or trivalent cations and 0.1 to about 15% of the residual cations. Preferably, the divalent cations are selected from calcium, magnesium, strontium, zinc, cadmium cations and mixtures of these, and the trivalent cations are selected from aluminum, cerium, lanthanum cations, mixtures of two or more lanthanide cations in which the total amount of lanthanum, cerium, praseodymium and neodymium cations present in the mixture comprises at least 50% of the total lanthanide cations.

Mesopore-structured materials whose nitrogen adsorption properties are enhanced by incorporating metal oxides or metal oxide precursors therein include those of the structural type HMS, FSM-16, KIT, MCM-41, MCM-48, MSU, SBA, etc. A preferred mesopore-structured material is MCM-41.

The metal oxide that is impregnated into the zeolite can be, in general, any metal oxide that is not incompatible with the zeolite and its intended use. Compatible metal oxides are those that can be safely incorporated into the zeolite and which will not be harmful to persons using the zeolites or adversely affect the desirable properties of adsorbent products made using the zeolites. Examples of suitable metal oxides include $Li_2O$, $Ag_2O$, $CuO$, $Cu_2O$, $CaO$, $MgO$, $SrO$, $ZnO$, $CdO$, $B_2O_3$, $Al_2O_3$, $Ga_2O_3$, $La_2O_3$, $Ce_2O_3$, $TiO_2$, $ZrO_2$, $V_2O_5$, $MnO$, $MnO_2$, $FeO$, $Fe_2O_3$, $NiO$ or mixtures thereof. Preferably, the metal oxide is an oxide of $Li_2O$, $Ag_2O$, $Cu_2O$, $MgO$, $ZnO$, $B_2O_3$, $La_2O_3$, $Ce_2O_3$, $Ga_2O_3$ and mixtures thereof. Examples of more preferred metal oxides are $Li_2O$, $Ag_2O$, $MgO$, $CuO$, $La_2O_3$ and mixtures thereof. The most preferred metal oxide is lithium oxide ($Li_2O$).

Metal oxide precursors useful in the invention include compounds comprised of one or more metal cations and one or more anions selected from halides, carboxylic acid moieties, nitrates, acetylacetonate moieties, carbonates, hydroxides, alkoxide moieties, and other compounds with organic ligands such as catechol, a diketone, a triketone, or mixtures thereof. Preferred metal oxide precursors include LiCl, AgCl, CuCl, $MgCl_2$, lithium acetate, $Mg(NO_3)_2$, LiOH, and $Mg(OH)_2$.

When the adsorbent is a zeolite, the metal oxide or metal oxide precursor is generally incorporated into the zeolite at a concentration in the range of about 0.005 to about 12 mmols, calculated as the oxide, per gram of dry zeolite. In preferred embodiments, the metal oxide or metal oxide precursor is incorporated into the zeolite at a concentration in the range of about 0.4 to about 4 mmols, calculated as the oxide, per gram of dry zeolite, and in more preferred embodiments the metal oxide or metal oxide precursor is incorporated into the zeolite at a concentration in the range of about 0.1 to about 3 mmols, calculated as the oxide, per gram of dry zeolite.

When the molecular sieve material is a mesopore-structured material, the metal oxide or metal oxide precursor is generally incorporated into the mesopore-structured material at a concentration in the range of about 0.01 to about 25 mmols, calculated as the oxide, per gram of dry mesopore-structured material. In preferred embodiments, the metal oxide or metal oxide precursor is incorporated into the mesopore-structured material at a concentration in the range of about 0.1 to about 15 mmols, calculated as the oxide, per gram of dry mesopore-structured material, and in more preferred embodiments the metal oxide or metal oxide precursor is incorporated into the mesopore-structured material at a concentration in the range of about 1 to about 10 mmols, calculated as the oxide, per gram of dry mesopore-structured material.

The compositions of the invention are prepared by infusing the desired concentration of metal oxide or metal oxide precursor into the pores of any of the porous adsorbent materials described above. This can be accomplished by any suitable method known to those skilled in the art, such as the liquid contact method, incipient impregnation, wet impregnation, dry gel impregnation, chemical vapor deposition, etc.

One of the more preferred methods is the liquid contact method, wherein an infusion agent, such as a solution or slurry of the material to be infused into the porous material, is contacted with the porous substance under suitable conditions of temperature, concentration, etc. In carrying out this procedure a solution or liquid slurry of the compound or mixture of compounds to be infused into the porous material is made and the solution or slurry is contacted with the porous material under conditions which result in infusion of the desired concentration of compound into the porous material. The preferred form of infusion composition is a mixture of the oxide and/or oxide precursor to be infused into the porous substance and an appropriate liquid carrier for the oxide or oxide precursor compound. The most preferred form of mixture is a liquid solution of the oxide or oxide precursor. Any solvent for the desired oxide or oxide precursor compound can be used in the preparation of the compositions of the invention, as long as the solvent does not physically or chemically modify the porous substance so that it is no longer useful for the intended purpose. The more preferred solvents are those which are readily removable from the porous substance by common purification techniques. Preferred solvents include water, alcohol and water-alcohol mixtures. These solvents are preferred because of their ready availability and low cost, and because of their ability to easily form solutions with a wide variety of oxide or oxide precursor compounds. When the solvent includes an alcohol, the alcohol is preferably a low molecular weight alcohol, such as $C_1$ to $C_5$ alcohols. Preferred alcohols are methanol, ethanol, propanol and the butanols. The most preferred alcohol is ethanol. Other solvents that can be used include organic liquids, such as ethers, ketones, etc., particularly those having 1 to 6 carbon atoms.

Contact between the oxide and/or oxide precursor and the porous substance can be carried out by any of the well known methods. For example, the porous substance can be submerged in or passed through a bath of the infusion agent of the desired concentration, or the infusion agent can be passed through a stationary bed of the porous substance. Sufficient contact between the oxide and/or oxide precursor and the porous substance to effect infusion of the desired amount of oxide or oxide precursor into the pore system of the porous substance is necessary. For example, when infusion is accomplished by submerging the porous substance in a bath of the infusion agent, the porous substance is soaked in the bath for a sufficient period of time to effect infusion of the desired amount of oxide or precursor into the porous substance, and then the porous substance is removed from the bath. Alternatively, when infusion is carried out by flowing a moving bed of the porous substance through a bath of the infusion agent or by flowing the infusion agent through a stationary bed of the porous substance, flow of the infusion agent or porous substance is carried out for a period of time sufficient to effect the desired extent of infusion of the oxide and/or oxide precursor into the porous substance.

Contact between the infusion agent and the porous substance can be carried out at any temperature at which no undesirable alteration of the porous substance occurs. Preferably contact is carried out at temperatures in the range of ambient temperature up to about 100° C. When the infusion agent is a solution, the concentration of oxide and/or oxide precursor in the solution can be at any desired value, but is preferably in the range such that the oxide and/or precursor remains in solution at the contact temperature. Solubility of the oxide and/or precursor in the solvent will, of course, depend upon the particular oxide and/or agents in the solution, the particular solvent present, and the temperature of the solution. In general, the higher the concentration of oxide and/or oxide precursor in the solution the shorter the contact time required to infuse the desired amount of oxide and/or precursor into the porous substance.

When the desired amount of infusion of oxide and/or oxide precursor into the porous substance is reached, contact between the infusion agent and the porous substance is terminated and the solvent or carrier liquid is removed from the porous substance.

Removal of the solvent or carrier liquid from the porous substance is carried out by any suitable method, for example by filtering and draining the solvent or carrier liquid from the porous substance and drying the porous substance. Drying can be effected by blowing dry air or a dry inert gas through the porous substance. Drying can be carried out at any temperature at which no degradation or undesired alteration of the porous substance occurs, but it is preferably carried out at ambient temperature or a temperature not in excess of about 100° C.

In some cases, the adsorbent composition may be useful in adsorptive applications upon removal of the solvent from the composition, i.e., it may be useable without further treatment. However, it is usually desirable or necessary to calcine the adsorbent composition to activate the adsorbent and to convert precursor to the oxide or to an other active form. This can be accomplished by heating the adsorbent composition in a dry inert atmosphere or in a dry oxygen-containing atmosphere. When an oxide precursor is infused into the porous substance it is generally preferable to calcine the adsorbent in a dry oxygen-containing atmosphere to oxidize the precursor to the oxide or to the desired stable oxygen-containing form of the precursor. Air, oxygen-enriched air, substantially pure oxygen or oxygen-inert gas mixtures, such as oxygen-nitrogen, oxygen-argon or oxygen-helium mixtures can be used in the calcination step.

Calcination can be carried out at any temperature at which no degradation or other undesirable alteration of the porous substance occurs. In general, calcination is carried out at any temperature up to about 600° C., and is preferably carried out at temperatures in the range of about 250 to about 500° C.

The adsorbent compositions used in the invention can have a variety of physical forms, and the exact physical form of the product may affect its efficiency in adsorption processes. When the adsorbent compositions of the invention are to be used in industrial adsorbers, it may be preferred to aggregate (e.g., pelletize) the adsorbent. Those skilled in molecular sieve technology are aware of conventional techniques for aggregating molecular sieves. Such techniques usually involve mixing the molecular sieve with a binder, which is typically a clay, thereby forming aggregates from the mixture, as by extrusion or bead formation, and then heating the formed aggregate to a temperature in the range of about 550 to about 700° C. to convert the "green" aggregate into a form which is resistant to crushing. The binders used to aggregate the zeolites may include clays, silicas, aluminas, metal oxides and mixtures thereof. In addition, the zeolites may be aggregated using materials such as silica-alumina, silica-magnesia, silica-zirconia, silica-thoria, silica-beryllia, and silica-titania, as well as ternary compositions, such as silica-alumina-thoria, silica-alumina-zirconia and clays present as binders. The relative proportions of the adsorbent and binder material may vary widely. Where the adsorbent is to be formed into aggregates prior to use, such aggregates are usually desirably about 0.5 to about 5 mm in diameter. Agglomeration may be carried out before or after infusion of the oxide and/or oxide precursor into the adsorbent.

The present adsorbent compositions can be used in many adsorption processes for the separation of fluids using the processes described below. Typically, such a process will be conducted with gases for the separation and/or removal of carbon dioxide, carbon monoxide, dinitrogen oxide and nitrogen from other gases which exhibit a less strongly expressed specific sorption intereaction than those specified above. Of course, the preferred adsorption process is the separation of nitrogen from air to produce oxygen or oxygen-enriched gas. Adsorption processes are generally known and can vary widely. Preferred processes are described below.

The adsorption process of the invention can be carried out in a system comprising a single adsorption unit or a battery of adsorption units operated in phase, or a plurality of adsorption units or batteries of adsorption units operated out of phase, whichever is desired. When a system comprising a single adsorption unit or a battery of units all of which are operated in phase is used, the adsorption step must be periodically stopped to permit regeneration of the adsorbent bed(s), whereas when a plurality of adsorption units are employed in parallel and operated out of phase, one or more units can be in adsorption service adsorbing the strongly adsorbed gas component, while one or more other units are undergoing regeneration to desorb the adsorbed gas component. Operation of the adsorption systems of the invention is preferably cyclical. In the preferred adsorption process, cycles are repeatedly carried out in a manner such that production of the desired product gas is substantially continuous. In preferred embodiments of the invention, the process is carried out in a twin bed system comprising a pair of adsorption vessels arranged in parallel and operated 180° of phase, with each adsorption vessel of the system being packed with the adsorbent composition of the invention.

The system in which the adsorption process of the invention is carried out may comprise only a layer of the adsorbent of the invention or it may comprise a series of layers contained in a single vessel or in two or more vessels arranged in series. For example, the system may comprise a first layer or bed of adsorbent which is selective for water vapor and/or carbon dioxide and a second layer or bed comprising the adsorbent compositions of the invention. Furthermore, a combination of alternate layers of different adsorbents which are selective for the component to be adsorbed, or mixtures of different adsorbents that are selective for the component to be adsorbed may be employed. The construction and arrangement of the adsorbent material of the invention is not critical to the invention. As used in this description, adsorption zones include monolayers and polylayers in conventional arrangements, and also includes laminates and monoliths in any type of block and/or wheel or rotary arrangements.

The adsorption process of the invention is preferably a cyclic adsorption process, such as pressure swing adsorption (PSA), temperature swing adsorption (TSA) or combinations of these. Regeneration of the adsorbents used in the invention may also be effected by purging the beds with or without pressure and/or temperature change during the regeneration step, relative to the adsorption step of the process.

The temperature at which the adsorption step is carried out may vary over a wide range, for example from a minimum temperature of about −190° to a maximum of about 100° C. It is generally preferred, however that the adsorption temperature be in the range of about 0 to about 60° C., and it is most preferred that it be in the range of about 5 to about 40° C.

The pressure at which the adsorption step can be carried out varies over wide ranges. For pressure swing adsorption cycles the adsorption step is generally carried out at a pressure in the range of about 0.8 to about 50 bara (bar absolute), and is preferably carried out at a pressure in the range of about 1 to 20 bar, and for temperature swing adsorption cycles the adsorption step is usually carried out at or above atmospheric pressure.

When the adsorption process is PSA, the regeneration step is generally carried out at temperatures in the neighborhood of the temperature at which the adsorption step is carried out and at an absolute pressure lower than the adsorption pressure. The pressure during the regeneration step of PSA cycles is usually in the range of about 0.1 to about 5 bara, and it is preferably in the range of about 0.2 to about 2 bara during regeneration. The regeneration phase may be a multi-step procedure which includes a depressurization step during which the vessels containing the adsorbent are vented until they attain the desired lower pressure, and an evacuation step, during which the pressure in the vessels is reduced to subatmospheric pressure by means of a vacuum inducing device, such as a vacuum pump.

When the adsorption process is TSA, bed regeneration is carried out at a temperature higher than the adsorption temperature, and is usually carried out at temperatures in the range of about 50 to about 300° C., and is preferably carried out at temperatures in the range of about 100 to 250° C. When a combination of PSA and TSA is used the temperature and pressure during the bed regeneration step are higher and lower, respectively, than they are during the adsorption step.

In some cases, in addition to the depressurization steps (PSA cycles) or the adsorbent heating steps (TSA cycles), it may be desirable to purge the bed with weakly adsorbed gas, such as the nonadsorbed product gas stream exiting the adsorption vessels. In this case the vessels may be purged (preferably countercurrently) with nonadsorbed gas. The purge step is usually initiated towards the end of the depressurization step, or subsequent thereto. The purge gas can be introduced into the adsorption vessels from a nonadsorbed product storage facility, for example, when the adsorption system comprises a single adsorption vessel; or from another adsorption vessel that is in the adsorption phase of an adsorption cycle, for example, when the adsorption system comprises multiple adsorption vessels arranged in parallel and operated out of phase.

The cycle used in the invention may include steps other than the basic steps described above. For example, when PSA processes are practiced, the cycle may include one or more bed equalization steps, a nonadsorbed product backfill step and countercurrent nonadsorbed product purge steps The sequential order and duration of the various steps are not critical, and these may be varied, as desired.

It will be appreciated that it is within the scope of the present invention to utilize conventional equipment to monitor and automatically regulate the flow of gases within the system so that it can be fully automated to run continuously in an efficient manner.

The invention is further illustrated by the following examples in which, unless otherwise indicated, parts, percentages and ratios are on a volume basis.

EXAMPLE 1

Comparative

This example illustrates the preparation of lithium-exchanged type X zeolite (LiX).

Zeolite NaX purchased from Aldrich Chemical Co. was transformed into its lithium form by a four-fold cation exchange of the parent NaX with 1 N LiCl aqueous solution over a period of 5 hours at 80° C. The zeolite was dried at 100° C. over night after the final exchange. The samples were analyzed by Inductively Coupled Plasma Atomic Emission Spectroscopy (ICP-AES) using an ARL-3510 Sequential ICP spectrometer. The lithium cation exchange level was more than 99% of the base sodium cations.

The dried powder sample was pelletized and the adsorption isotherms for nitrogen ($N_2$) and oxygen ($O_2$) on the pelletized samples were measured gravimetrically using a Cahn 2000 Series microbalance enclosed in a stainless steel vacuum/pressure system. Pressure measurements in the range 1–6800 mbar were made using a MKS Baratron pressure sensor. About 100 mg of the sample was carefully evacuated and its temperature increased to 400° C. at a rate of 2° C. per minute and the final temperature was held for 3 hours. Upon cooling down the sample in vacuo, adsorption isotherms for nitrogen and oxygen were measured at 25° C. in the pressure range 20–6800 mbar for nitrogen and 20–2000 mbar for oxygen and the data were fitted to a single or multiple site Langmuir isotherm model. The fits to the nitrogen data were used to calculate the nitrogen capacities of the samples at 1000 mbar. The selectivities of the samples for nitrogen over oxygen at 1000 mbar and 25° C. were derived from the pure gas isotherms for nitrogen and oxygen using Langmuir mixing rules (ref., e.g., A. L. Myers: AIChE: 29(4), (1983), p.691–693). The usual definition for selectivity was used, where the selectivity (S) is given by:

$$S=(x_{N2}/y_{N2})/(x_{O2}/y_{O2}).$$

where $x_{N2}$ and $x_{O2}$ are the mole fractions of nitrogen and oxygen, respectively, in the adsorbed phase, and $y_{N2}$ and $y_{O2}$ are the mole fractions of nitrogen and oxygen, respectively, in the gas phase.

The adsorption results for this sample are shown in Table 1.

EXAMPLE 2

The LiX sample of Example 1 was modified by impregnating 10.0 g of LiX (on dry basis) with 50 ml of 0.172 M lithium hydroxide LiOH (Aldrich Chemical Co.) aqueous solution. The slurry was dried at 100° C. overnight. The adsorption results for LiOH modified LiX sample are shown in Table 1.

EXAMPLE 3

The LiX sample of Example 1 was modified by impregnating 10.0 g of LiX (on dry basis) with 40 ml of 0.75 M lithium peroxide, $Li_2O_2$ (Aldrich Chemical Co.) aqueous solution. The slurry was dried at 100° C. overnight. The adsorption results for $Li_2O_2$ modified LiX sample are shown in Table 1.

EXAMPLE 4

Another LiX sample was modified by impregnating 10.0 g of LiX (on dry basis) with 71 ml of 0.91 M lithium chloride, LiCl (Aldrich Chemical Co.) aqueous solution. The slurry was dried at 100° C. overnight. The adsorption results for LiCl modified LiX sample are shown in Table 1

TABLE 1

Adsorption data for LiX and modified LiX samples

| Sample description | | $N_2$ Uptake 1000 mbar, mmol/g | $O_2$ Uptake 1000 mbar mmol/g | Selectivity $N_2/O_2$ 1000 mbar |
|---|---|---|---|---|
| Example 1 | LiX | 1.162 | 0.200 | 5.8 |
| Example 2 | LiX-LiOH | 0.993 | 0.164 | 6.1 |
| Example 3 | LiX-Li$_2$O$_2$ | 0.312 | 0.043 | 7.3 |
| Example 4 | LiX-LiCl | 0.068 | <0.005 | >13.6 |

The above Examples show that the nitrogen/oxygen separation factor of LiX can be remarkably and unexpectedly improved by infusion of lithium hydroxide, lithium peroxide and lithium chloride into the parent LiX zeolite.

Although the invention has been described with particular reference to a specific example, the example is merely exemplary of the invention and variations are contemplated. The scope of the invention is limited only by the breadth of the appended claims.

What is claimed is:

1. A composition comprising a molecular sieve material containing of the total exchangeable cations at least 50% being a cation selected from the group consisting of Li, Ca, Ag, Cu and mixtures thereof and having impregnated within its pore system at least one metal oxide or metal oxide precursor selected from the group consisting of $Li_2O$, $Ag_2O$, CuO, $Cu_2O$, CaO, MgO, SrO, ZnO, CdO, $B_2O_3$, $Al_2O_3$, $Ga_2O_3$, $La_2O_3$, $Ce_2O_3$, $TiO_2$, $ZrO_2$, $V_2O_5$, MnO, $MnO_2$, FeO, $Fe_2O_3$, NiO, and mixtures thereof.

2. The composition of claim 1, wherein said molecular sieve material is of the structural type BEA, CHA, EMT, ERI, FAU, FER, GIS, HEU, LTA, LTL, MAZ, MEI, MEL, MFI, MOR, MTW, OFF, ZSM-2, ZSM-18, ZSM-48 and mixtures thereof.

3. The composition of claim 2, wherein about 0.005 to about 12 mmol of said metal oxide or metal oxide precursor, calculated as the oxide per gram of dry zeolite, is present within the pore system of said molecular sieve material.

4. The composition of claim 3, wherein said metal oxide precursor comprises a compound that consists of one or more metal cations and one or more anions selected from the group consisting of halides, carboxylic acid moieties, nitrates, acetylacetonate moieties, carbonates, hydroxides, alkoxide moieties, and compounds with organic ligands selected from the group consisting of catechol, diketone, triketone, and mixtures thereof.

5. The composition of claim 4, wherein about 0.03 to about 4 mmol of said compound is present within the port system of said molecular sieve material.

6. The composition of claim 5, wherein said compound is $Li_2O$, $Ag_2O$, CuO, MgO, $Al_2O_3$, rare earth oxides and mixtures thereof or precursors of these oxides.

7. The composition of claim 6, wherein said molecular sieve material is of the structural type CHA, EMT, FAU, LTA, LTL, MFI, MOR, OFF and mixtures thereof.

8. The composition of claim 7, wherein about 0.1 to about 3 mmol of said compound calculated as the oxide per gram of dry zeolite, is present within the pore system of said molecular sieve material.

9. The composition of claim 7, wherein said molecular sieve material contains more than 70% of said cations.

10. The composition of claim 9, wherein said molecular sieve material is type X zeolite and at least 90% of whose exchangeable cations are Li, Ca, Ag, Cu and mixtures thereof.

11. The composition of claim 10, wherein said type X zeolite has an Si/Al atomic ratio in the range of about 0.9 to about 1.25.

12. The composition of claim 9, wherein at least 70 to about 99.8% of said exchangeable cations are lithium cations; 0.1 to about 29.9% of said exchangeable cations are selected from one or more of the following groups: monovalent cations selected from sodium, potassium and mixtures thereof; divalent cations selected from magnesium, barium, strontium, zinc, and copper (II), and mixtures of these; trivalent cations selected from aluminum, scandium, gallium, iron (III), chromium (III), indium, yttrium, single lanthanides, mixtures of two or more lanthanides, and mixtures of said monovalent, divalent and trivalent cations; and 0.1 to about 15% of said exchangeable cations are residual cations selected from ammonium, hydronium, zinc, copper (I) and mixtures of these.

13. A method of separating gases by removing a first gas selected from carbon dioxide, carbon monoxide, dinitrogen oxide and nitrogen from a gas stream comprised of one or more of said first gas from other gases which exhibit a less strongly expressed specific sorption interaction with the adsorbent material than said first gas, said method comprising passing said gas stream through at least one adsorption zone containing the composition of claim 1, thereby producing an enriched component of one or more of said first gas.

14. A method of producing oxygen enhanced gas from air comprising passing air through at least one adsorption zone containing the composition of claim 1, thereby yielding an oxygen-depleted adsorbed component and an oxygen-enriched nonadsorbed gas component.

15. The method of claim 14, further comprising desorbing said oxygen-depleted adsorbed component from said adsorption zone.

16. The method of claim 15, wherein said method is a cyclic adsorption process selected from pressure swing adsorption, temperature swing adsorption, concentration swing adsorption and combinations of these.

* * * * *